March 3, 1936. E. H. VEDDER 2,033,016
CIRCUIT FOR PHOTOELECTRIC CONTROLLERS
Filed Oct. 19, 1932 2 Sheets-Sheet 1

WITNESSES:

INVENTOR
Edwin H. Vedder.
BY
ATTORNEY

March 3, 1936.   E. H. VEDDER   2,033,016
CIRCUIT FOR PHOTOELECTRIC CONTROLLERS
Filed Oct. 19, 1932   2 Sheets-Sheet 2

WITNESSES:
C. J. Weller
Wm. C. Groome

INVENTOR
Edwin H. Vedder.
BY F. W. Lyle
ATTORNEY

Patented Mar. 3, 1936

2,033,016

UNITED STATES PATENT OFFICE 2,033,016

CIRCUIT FOR PHOTOELECTRIC CONTROLLERS

Edwin H. Vedder, Swissvale, Pa., assignor to Westinghouse Electric & Manufacturing Company, East Pittsburgh, Pa., a corporation of Pennsylvania Application October 19, 1932, Serial No. 638,519

7 Claims. (Cl. 250—41.5)

This invention relates to control systems and particularly to systems in which a grid-glow tube controlling a load is controlled by a photo-cell.

Heretofore it has been possible to control the supply of power to fairly heavy loads (say, several hundred watts) by means of a photo-cell, but intricate, delicate and expensive parts have been necessary in order to effect the control. By controlling the phase of the voltage impressed upon the grid of a grid-glow tube the current through it may be controlled. When the grid-glow tube is adapted to deliver currents of the order of several tens of amperes, the control thereof by means of a photocell has heretofore been regarded as impractical, requiring delicate relays or the like, but I have found it possible to so arrange the apparatus that the very small currents which traverse a photo-cell can be caused to produce a sufficient change in the phase of the grid potential to secure reliable control without requiring any other amplifying device than the grid-glow tube itself.

The invention described in this application is an improvement upon the invention described in the application of L. R. Quarles, Serial No. 616,481, filed June 10, 1932, and assigned to the Westinghouse Electric & Manufacturing Company, which became Patent No. 1,984,987 on Dec. 18, 1934.

It is an object of my invention to produce a control system in which the grid potential is the sum of two potentials having a phase difference in the neighborhood of a quarter-cycle.

It is a further object of my invention to provide an adjustment for controlling the amplitude of one of said two potentials, and thereby controlling the phase of the resulting grid potential.

It is a further object of my invention to include a photo-cell in the grid connection in such a way that change in the illumination of the photo-cell shall produce a change in the phase of the grid potential.

It is a further object of my invention to impress on said photo-cell a voltage well removed in phase from the anode voltage of the grid-glow tube and thus to secure certainty of response to change in the illumination.

It is a further object of my invention to provide an adjustment whereby compensation may be had for the character of the load, the character of the tube and the character of the transformer. By such compensation the phase of the grid potential may be adjusted to such a relation with the anode potential that the system is in its most sensitive state. Obviously, the adjustment may be made to regulate the sensitiveness of the device by a greater or less departure from the adjustment which gives greatest sensitiveness.

It is a further object of my invention to provide a combination in which the sensitiveness of the response of the grid-glow tube to changes in the illumination of the photo-cell can be regulated by an adjustment of a potentiometer.

Other objects of the invention and the structure of the apparatus employed will be apparent from the following description and the accompanying drawings, in which.

Figure 1:
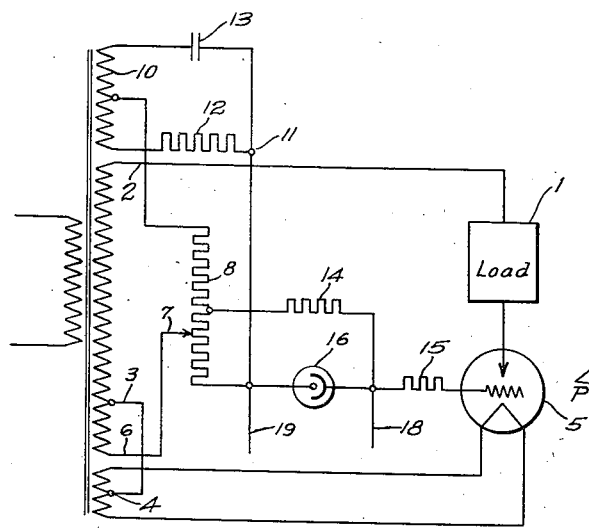
Figure 1 is a diagram illustrating the circuits and apparatus in one form of my invention.

The load 1 in Fig. 1 is supplied from a transformer having several secondaries. The lead 2 extends from one terminal of the secondary supplying the load and the lead 3 extends from an intermediate point of the same secondary to the mid-point 4 of a secondary supplying the cathode-heating current for a grid-flow tube 5. A lead 6 extends from the other terminal of the secondary supplying the load to the slider 7 of a potentiometer 8. The lead 3 is connected to the secondary between the leads 2 and 6, nearer to the lead 6 than to the lead 2.

A separate winding 10 upon the same core constitutes another secondary. The mid-point of the secondary 10 is connected to the one terminal of the resistor of potentiometer 8.

The voltage to be delivered by the secondary 10, when the load supplied through the tube 5 is of a usual sort, is preferably approximately the same as the voltage delivered by the winding 2—3. However, if the load be of a sort which requires an unusually high voltage, the voltage delivered by the secondary 10 may be somewhat less than that delivered to the load.

A resistor 12 and a condendser 13 are connected in series between the terminals of the secondary 10 and the junction point 11 between the resistor and condenser is connected to the opposite terminal of the potentiometer 8.

From the mid-point of the potentiometer 8 a connection is made, through a resistor 14 and a resistor 15 in series, to the grid of the tube 5. The junction of resistors 14 and 15 is connected to one element of a photo-cell 16, the other element thereof being connected to that terminal of the potentiometer 8 which is connected to the point 11.

Figure 3:
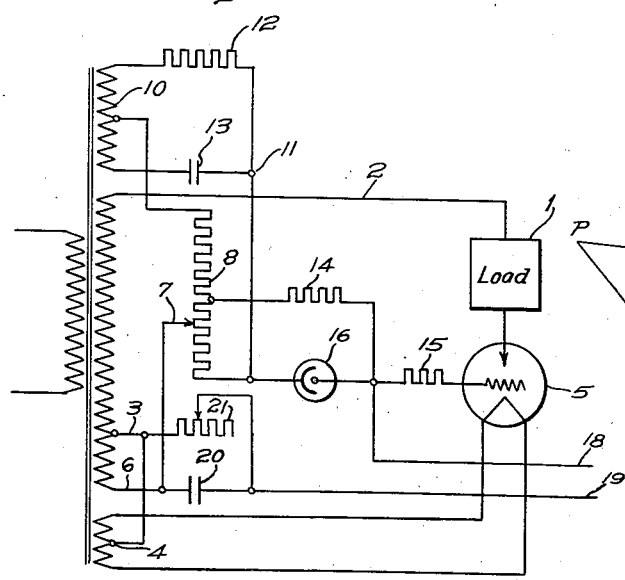
Figs. 3 and 4 are respectively a similar circuit diagram and a similar vector diagram showing a modification.

In the form illustrated in Fig. 1, the resistor 12 and condenser 13 are arranged oppositely to the arrangement of the same parts in Fig. 3, and the position of the photo-cell 16 in one of these figures is the reverse of its position in the other, that is, in Fig. 1 the cathode is connected to the resistor 15, and the anode to the point 11, while in Fig. 3, the anode is connected to the resistor 15 and the cathode to the point 11.

Any contact-making device, such as a thermostat, may be used either as a substitute for or as a supplement to the photo-cell 16. The lines 18 and 19 represent the connections to such a contact device. The conductor 18 is connected to the junction of resistors 14 and 15 and the conductor 19 is connected, in Fig. 1 to the anode of the photo-cell; in Fig. 3 it is connected to the leads 3 and 6. The connection to these leads is through an adjustable resistor 21 and a condenser 20 respectively. The junction-point of condenser 20 and resistor 21 through which they are connected in series, is connected to the conductor 19. The condenser 20 may be made adjustable instead of or in addition to the adjustment of resistor 21 or the condenser may be omitted, the conductor 19 being directly connected to the terminal 6 and the end of the resistor 21.

Figure 5:
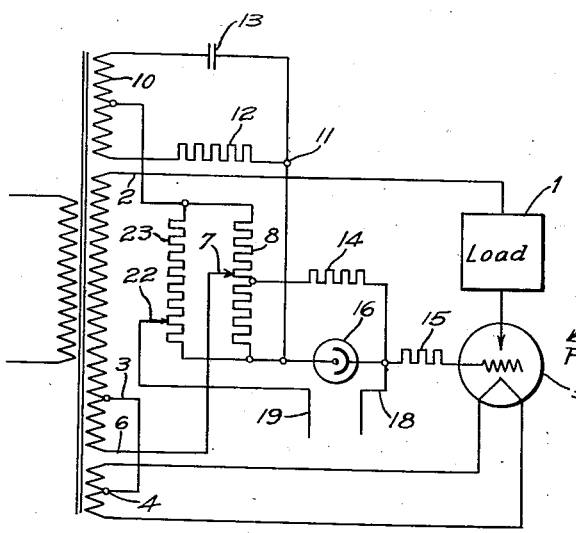
Figs. 5 and 6 are respectively a similar circuit diagram and a similar vector diagram for another modification.

Another provision for control by contacts as a substitute for or as a supplement to the photo-cell in that form of the device illustrated in Fig. 1 is illustrated in Fig. 5 in which the conductor 19 is connected to a slider 22 upon a second potentiometer resistance 23, in parallel with the resistance of the potentiometer 8.

Figure 7:
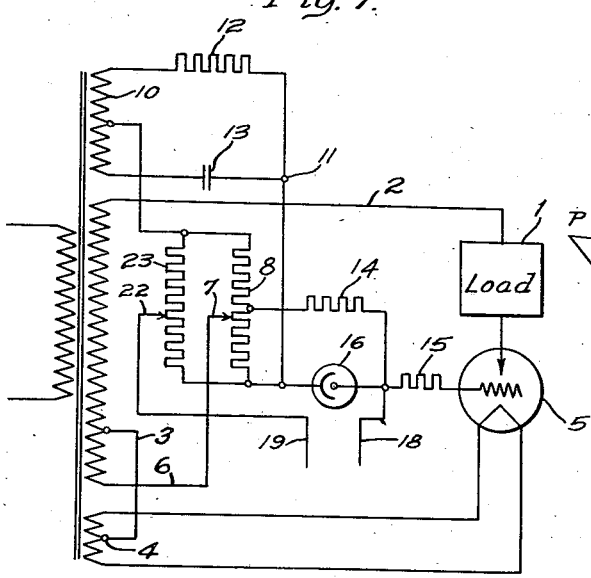
Figs. 7 and 8 are respectively a similar circuit diagram and a similar vector diagram for still another modification.

In Fig. 7, a similar provision for contact control is applied to that form of the invention illustrated in Fig. 3. The conductor 19 is connected to a slider 22 upon a potentiometer resistance 23, in parallel to the resistance of the potentiometer 8.

In the operation of the device, when the potential impressed by the secondary is toward the anode of the tube 5, current will flow in the load 1, provided that the potential upon the grid of this tube is, at that time such as to permit the tube to conduct.

Figure 2:
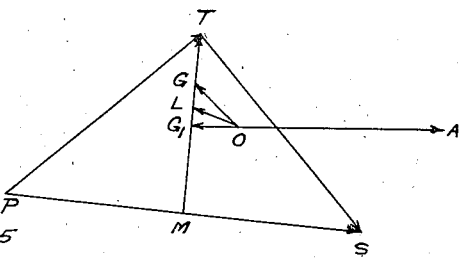
Fig. 2 is a vector diagram to which reference will be made in explaining the operation of Fig. 1.

The potential delivered to the anode in Fig. 1 is represented by the vector OA in Fig. 2. The winding between the leads 3 and 6 delivers a potential which ordinarily will not be 180° out of phase with the potential between the leads 3 and 2, because, although these two secondaries are parts of the same winding and are mounted on the same core, there is some leakage of flux between them, and also because the regulation of the transformer including the secondary 3—6 is different from the regulation of the transformer including the secondary 2—3.

Assuming that the voltage delivered by the secondary 3—6 leads the anode voltage by somewhat less than 180°, it has been represented in Fig. 2 by the vector OL.

As the winding 10 is on the same core with the winding 2—3, the phase of the voltage delivered therby will be nearly, but not necessarily exactly, the same as that of the voltage delivered by the winding 2—3. This has been indicated in Fig. 2 by showing the vector PS nearly but not quite parallel to the vector OA.

The condenser 13 and the resistor 12 are so chosen that the potential difference between the mid-point of the secondary 10 and point 11 will be substantially at right angles to the vector PS. The vector TS represents the voltage across the condenser 13 and the vector PT represents the voltage across the resistor 12. The vector PS represents the vector sum of the two voltages, it is thus equal to the voltage generated by the secondary 10. The two vectors PT and TS are at right angles to each other, and in order that the vector MT shall be perpendicular to PS at its mid-point, the vectors ST and TP must be of equal length. The relative magnitudes of resistors 12 and condenser 13 are chosen in accordance with this requirement.

The vector MT represents the potential difference along the potentiometer resistance 8. The mid-point of the vector MT will, therfore, represent the potential of the mid-point of the resistor 8, to which the grid is connected.

Assuming that the photo-cell 16 in Fig. 1 is dark, it acts substantially as an open circuit and the grid of tube 5 will have the same potential as the mid-point of the potentiometer 8. The action when the photo-cell is illuminated will be discussed after the completion of the description of the action when it is dark.

The slider 7 receives its potential from the secondary 3—6. The potential of the slider may be thought of as the drop over the connection through 14, 15 and the grid-cathode space of the tube 5. In this sense, it is represented by the vector OL and is that component of the grid potential which is caused by the secondary 3—6. The point L will fall somewhere along the line TM because the slider 7 is located somewhere along the resistor 8. If the slider 7 is not exactly opposite the mid-point, the potential represented by vector OL will not represent the potential of the grid of the tube 5, but there must be added to OL a vector to correspond to the drop along the resistor 8 from slider 7 to the mid-point.

As Fig. 1 is drawn, the slider 7 is nearer the point 11 than is the mid-point of the resistor 8. The voltage from slider 7 to this mid-point of resistor 8 is, therefore, a voltage in the sense from T toward M, and it may be represented by the portion LG₁ of the vector MT. This voltage added to the voltage OL gives the voltage OG₁ as the actual grid voltage corresponding to the illustrated position of the slider. By moving the slider along the potentiometer resistor 8, the magnitude of the vector to be added to the vector OL may be changed and if the slider is moved past the mid-point of the resistor, the sense of this vector will be reversed.

By properly moving the slider 7, the phase of the voltage on the grid of the tube 5 may be so adjusted that it differs by exactly 180° from the voltage OA.

With this adjustment of the grid-voltage, whenever the anode voltage is positive, that is, whenever the electromotive force is in the direction in which the tube 5 is conductive, the grid voltage is negative, that is, it is in a sense to prevent the tube 5 from conducting current. The grid voltage will become positive only during that portion of the cycle when the electromotive force across the tube 5 is in the non-conductive direction. The tube 5 would, therefore, be conductive during no part of the whole cycle and thus would carry no current.

Exact phase-opposition is not necessary for the tube to carry zero current. Different tubes permit different degrees of departure from exact phase-opposition before they become conducting. In some cases a range of as much as 20° either way from exact opposition may exist through which conduction will be prevented.

As soon as the phase of the grid voltage differs from phase opposition with the anode voltage by more than the small angle characteristic of the tube, the tube will become conductive during some portion of the cycle. As the device usually is adjusted this occurs early in the positive half-cycle. The tube then conducts throughout nearly the whole of the positive half-cycle because, even though the grid potential later becomes more negative than the critical potential, it does not stop the current. Once such current has started, it will continue until the anode potential has reached zero.

By adjusting the phase of the grid potential almost to the critical point, it is possible to so arrange the apparatus that a very small change in the phase of the grid potential will cause the tube to become conductive, and when it becomes conductive it will conduct nearly its maximum current. The apparatus, when thus adjusted, is very sensitive.

While the photo-cell 16 of Fig. 1 is dark, it prevents the electromotive force supplied by the potential drop present in the lower half of the potential drop resistor 8 from acting as an electromotive force for the circuit through the photo-cell 16 and the resistor 14. The potential impressed upon the grid of the tube 5 is the potential of the mid-point of the resistor 8 in combination with the potential supplied from the secondary 3—6.

When the tube 16 is illuminated it becomes conductive but it possesses a considerable resistance. The potential drop over the lower half of the resistor 8 now serves as a source of electromotive force for the circuit comprising resistor 14 and photo-cell 16 in series.

The potential applied to the grid will depend upon the ratio between these two resistances and will, therefore, be a potential corresponding to some point along the resistor 8 between the midpoint and the end connected to the point 11.

In addition to the potential derived from the secondary 10 and distributed as just described over the circuit 14—16, the potential from the secondary 3—6 represented by the vector OL is impressed upon the grid. The grid, therefore, now receives a potential which is the sum of OL and a potential represented by the vector LG.

Thus OG represents the grid potential when the photo-cell 16 is illuminated. It differs by a considerable angle from phase opposition with OA and, therefore, will ensure the tube 5 being conductive while the photo-cell is illuminated. The angle between OG₁ and OG must, of course, exceed the critical angle of the tube 5, in order that this effect may be obtained with certainty.

In the form of the device illustrated in Fig. 3, the tube 5 is to be non-conducting when the photo-cell 16 is illuminated and is to become conducting when the photo-cell is dark. In order to accomplish this the photo-cell 16 is reversed in position so that it is conductive when the electromotive force is from the point 11 toward the grid instead of in the opposite direction. At the same time, the resistor 12 and condenser 13 have been reversed in relative position, as compared with Fig. 1, whereby the direction of the voltage impressed upon the photo-cell is reversed; so that, in both Fig. 1 and Fig. 3, the voltage across the photo-cell is in the conductive direction during the early part of that half-cycle during which the potential of the secondary 2—3 is toward the anode of tube 5.

Figure 4:
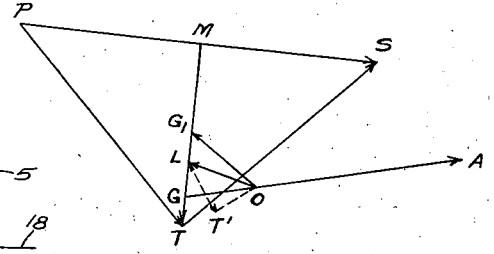

When the photo-cell 16 is conductive in Fig. 3, the current through the resistor 14 is in the opposite direction from what it was in Fig. 1. The sense of the change in potential produced upon the grid by illuminating the tube in Fig. 3 is, therefore, opposite to the sense of the corresponding change in Fig. 1. The reversal of the direction of the potential along the resistor 8 is illustrated in Fig. 4 by the downward direction of the vector MT in this figure. In Fig. 4, OG₁ represents the phase of the grid voltage obtained when the photo-cell 16 is dark and it will be observed that the slider 7 has been so set that this voltage produces a conductive condition of the tube 5 in the same way that the voltage OG does in Fig. 2.

Upon the illumination of the photo-cell the voltage corresponding to LG₁ is no longer added to the voltage OL, but a voltage LG is thus added and the grid voltage with the photo-cell illuminated is such as to make the tube non-conductive.

If the photo-tube 16 in Fig. 3 be permanently dark, or if it be omitted, control of the tube 5 may be exercised by a contact device connecting and disconnecting the conductors 18 and 19. When these conductors are connected, the potential from the secondary 3—6 is shifted in phase by means of the resistor 21 and condenser 20, and applied directly to the grid through the conductors 19—18 and the resistor 15. When these conductors are separated, the potential determined by the position of the slider 7 on the resistor 8 fixes the grid potential.

When conductors 18 and 19 of Fig. 3 are connected, the grid of tube 5 is connected to one extremity of resistor 21 and the cathode to the other. The dotted vectors OT' and T'L of Fig. 4 show how the potential of secondary 3—6 is divided between resistor 21 and condenser 20 respectively and OT' represents the grid potential. Actually OT' will lie nearly in phase opposition to OA. It has been drawn at a larger angle to OL than the correct one in order to make the figure clearer.

This variation in the device is useful when the load 1 is a heater or the relay controlling a heater. A thermostat would then establish the connection between 18 and 19 when a particular temperature is reached.

My invention is intended to be embodied in an apparatus equipped both with the photo-cell and with the conductors 18 and 19, whereby it may be applied to either use at the option of the user.

Figure 6:
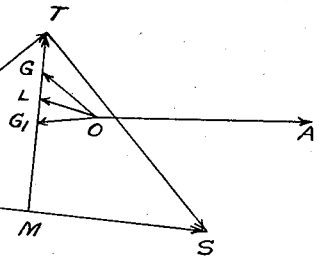

In the form illustrated in Figs. 5 and 6, the conductors 18 and 19 have been added to that form of the device illustrated by Fig. 1. The conductor 19 requires a separate potentiometer which is shown at 23 and is equipped with a slider 22. In the illustrated position of the slider 7, the grid voltage would be represented by the vector OG₁ of Fig. 6, when the photo-cell is dark and the conductors 18 and 19 are separated.

If these conductors be connected by the action of a thermostat or other circuit closer, the slider 22 will produce its effect upon the grid while the slider 7 and potentiometer 8 being shunted will produce little effect. The potential of the grid will then be represented by the vector OG. Thus, the contactor uniting conductors 18 and 19 can be made to control the phase of the grid potential.

Instead of a second potentiometer resistor 23, the slider 22 may be mounted upon the resistor 8 above the slider 7.

Figure 8:
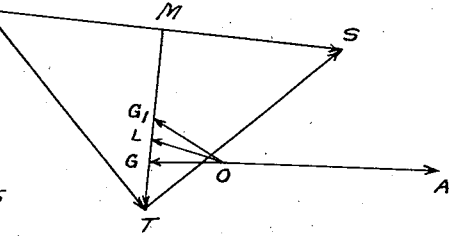

Similar remarks apply concerning Figs. 7 and 8 in which the conductors 18 and 19 are connected to that form of the device illustrated in Fig. 3, the connection being made in the way explained while describing Fig. 5. The corresponding change in the phase of the grid potential is shown in Fig. 8.

If the second potentiometer 23 be omitted and the slider 22 mounted upon the resistor 8, in Fig. 7, care must be taken not to move the slider 22 too near the lower end of the potentiometer 8 because, if the vector OG of Fig. 8 approaches too closely to the position OT, the tube will tend to become conductive near the end of the positive half-cycle which will produce a different behavior from that intended.

Adjustment of the slider 7 or 22 can control the voltage impressed on the contacts controlling conductors 18 and 19. Provision can thus be made for special conditions requiring unusually delicate contacts.

In all of the figures it is to be noted that the potential across the photo-cell is of the phase represented by the vector MT, which is approximately 90° out of phase with the anode voltage represented by OA. The advantage of this arrangement will be more readily seen by considering the consequences of a voltage across the photo-cell in phase with the anode voltage. This would be approximately the same as in phase with the voltage delivered by the transformer secondary 3—6.

The current through any photo-cell arises approximately in proportion to the voltage across it at the beginning of the positive half-cycle, but it soon becomes nearly constant and continues nearly constant until the end of the positive half-cycle approaches, when it again becomes approximately proportional to the voltage.

At the beginning of the positive half-cycle, therefore, the current through the photo-cell is small and of changing value. The drop over the resistor 14 incident to this current is, therefore, also small and uncertain, but at this moment, the voltage delivered by the transformer secondary 3—6 is also small, and since the phase of this voltage relative to the anode voltage is not exactly 180°, it is also of uncertain amount.

It thus results that accidental circumstances may easily make a change in the behavior of the device, because the grid potential at the beginning of the positive half-cycle is the sum of two voltages, both small and both uncertain. Very small changes in the phase of this voltage may result in the complete change in the behavior of the tube 5.

Moreover, a similar uncertainty exists near the end of the half-cycle and if a break-down of the tube should occur near the end of the positive half-cycle when it was intended to produce a break-down near the beginning of that half-cycle, the behavior of the tube 5 will be completely different from that intended.

The circumstance that the photo-cell is conductive in one direction only as well as the quarter-phase relation between the voltage across it and the anode voltage of tube 5 is conducive to certainty of control near the end of the half-cycle. When tube 16 conducts no current, there is no drop over resistor 14. If, in the connections of Fig. 3 or Fig. 7, the photo-cell 16 were replaced by, for example, a light-sensitive selenium resistor, current could flow to the left through resistor 14 and so add a positive component to the potential to the grid of tube 5. The current through resistor 14 would be in this direction while the intended grid voltage $OG_1$ is negative. The positive component added to the intended grid voltage might make the resultant grid potential positive or at least prevent it from being sufficiently negative to maintain the tube non-conducting. With a device which prevents current toward the left in 14, this cannot happen.

When the voltage across the photo-cell is in quarter-phase relation to the voltage at the anode of the tube 5, the current through the photo-cell, and therefore, the drop across the resistor 14 is certain and predictable at the beginning of the positive half-cycle of said anode voltage. Thus, a control of the phase of the resultant of the voltage from the secondary 3—6 and from the secondary 10 will determine the behavior of the tube 5 with certainty.

There are some photo-cells, particularly those of the gas-filled type, in which the current near the middle of the positive half-cycle is greater than the steady value which, in most photo-cells, exists from near the beginning to near the end of the positive half-cycle. This characteristic is of advantage when the photo-cell voltage has the quarter-phase relation to the anode voltage already described, because the increase in current to the photo-cell, by increasing the drop through the resistor 14, increases the certainty with which the tube 5 will become conductive at the desired time.

I have discovered that, in the combinations herein disclosed, the grid current in the tube 5 at the moment when that tube becomes conducting is either zero or very small. For this reason, no substantial losses will result from making the resistance of resistor 14 large. I can, therefore, make the drop over resistor 14 when the photo-cell 16 conducts current much greater than has heretofore seemed feasible. I have used as much as a hundred megohms in resistor 14 without disadvantage.

By providing detachable connectors, such as links, binding-posts, and the like, the system illustrated in Figs. 1 and 5 may be readily changed into that illustrated in Figs. 3 and 7.

In one form of my device, the transformer was designed to produce 220 volts between the points 2 and 3 and 50 volts between the points 3 and 6, the tap 3 was at ⅛ of the distance between 2 and 6. In this form, each one-half of the secondary 10 delivered 110 volts. The condenser 13 was one-half a microfarad and the resistor 12 5,000 ohms. In this same form, each half of the potentiometer resistor 8 was 2,500 ohms, the resistor 14 was 10 megohms and the resistor 15 1/10 of a megohm. The secondary supplying the cathode heating current was designed to deliver 2½ volts. With this form of the device I was enabled to control the current through a relay controlling 30 amperes, the relay itself using 30 watts.

With a very similar construction, using the same tube but a different transformer, I found it possible to control a relay intended to control 600 amperes. With another installation, in which the connections 2 and 3 were to the main line instead of through a transformer, I found it possible to control a tube delivering 6 amperes direct current.

Although I have illustrated and specifically described only a few modifications of my invention, many other modifications will be obvious to those skilled in the art, and are intended to be included herein. No limitation is intended except what is required by the prior art or is expressed in the claims.

I claim as my invention:

1. In combination, a source of alternating-current power, a load supplied therefrom, a grid-controlled space-current device controlling the supply of power from said source, two sources of potential of different phase in addition to said power source, connections for combining the potential from one of said sources and a fraction of the potential from the other and impressing the resultant of said combination between the grid and the cathode of said grid-controlled device, said connections also including an adjustable device for determining said fraction and a control device in addition to said adjustable device for altering the fraction of the potential from said other source combined with the potential from the first said source and thereby altering the phase of the potential supplied between said grid and said cathode.

2. In a control system, a grid-controlled space-current device, a photo-sensitive device connected to the grid of the grid-controlled device, means for impressing a potential of adjustable phase between said grid and the cathode of said device, said means including means for impressing across the photo-sensitive device a potential the phase of which is independent of said adjustment.

3. In a control system a grid-controlled space-current device, a source of anode potential therefore, a source of grid potential having a fixed phase relation thereto, a second source of grid potential and means associated therewith for producing a fixed shift of phase, a network, means for impressing potential of said shifted phase across a portion of said network to produce a distribution of potentials in said network, said network being connected to the first-named source of grid potential at a single point only and to the grid of said grid-controlled device at a single point only, whereby the potential impressed between the grid and the cathode is the resultant of the potential from said first-named source of grid potential and said distributed potential.

4. In a control system a grid-controlled space-current device, a source of anode potential therefore, a source of grid potential having a fixed phase relation thereto, a second source of grid potential and means associated therewith for producing a fixed shift of phase, a network, means for impressing potential of said shifted phase across a portion of said network to produce a distribution of potentials in said network, said network being connected to the first-named source of grid-potential at a single point only and to the grid of said grid-controlled device at a single point only, whereby the potential impressed between the grid and the cathode is the resultant of the potential from said first-named source of grid potential and said distributed potential, one member of said network being a control device, the resistance of which changes with control conditions, whereby the distribution of potentials in said network and thereby the phase of the potential delivered between the grid and the cathode is changed in accordance with changed control conditions.

5. In a control system a grid-controlled space-current device, a source of anode potential therefore, a source of grid potential having a fixed phase relation thereto, a second source of grid potential and means associated therewith for producing a fixed shift of phase, a network, means for impressing potential of said shifted phase across a portion of said network to produce a distribution of potentials in said network, said network being connected to the first-named source of grid-potential at a single point only and to the grid of said grid-controlled device at a single point only, whereby the potential impressed between the grid and the cathode is the resultant of the potential from said first-named source of grid potential and said distributed potential, one member of said network being a photo-sensitive device, whereby the distribution of potentials in said network and thereby the phase of the potential delivered between said grid and said cathode is changed in accordance with the illumination of said photo-sensitive device.

6. In a control system, a source of power, means for supplying potential differences between three sets of points therefrom, a grid-controlled space-current device, connections for supplying anode potential to said device from one of said sets of points, connections from another of said sets of points to the grid, and the cathode of said device, respectively, and connections including a phase-shifting network from the third of said sets of points to the said connection to the grid, whereby potential of a predetermined phase is superposed upon the potential supplied from said second means between the grid and the cathode, said connection for superposing including a photo-sensitive control device for changing the relation between the component potentials.

7. In a control system, a grid-controlled space-current device, a uni-directionally-conductive photo-sensitive device connected to the grid of the grid-controlled device, means for impressing a potential of adjustable phase between said grid and said cathode, said means including means for impressing across the photo-sensitive device a potential the phase of which is independent of said adjustment.

EDWIN H. VEDDER.